US009699118B2

United States Patent
Griswold et al.

(10) Patent No.: US 9,699,118 B2
(45) Date of Patent: Jul. 4, 2017

(54) SYSTEM FOR FLEXIBLE DYNAMIC REASSIGNMENT OF THROUGHPUT

(71) Applicant: AVAGO TECHNOLOGIES GENERAL IP (SINGAPORE) PTE. LTD., Singapore (SG)

(72) Inventors: Mark David Griswold, Fremont, CA (US); Michael Hei-Lung Lau, Rockville, MD (US); Kandasamy Aravinthan, San Jose, CA (US); Nathan Shumway Hill, Milpitas, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 343 days.

(21) Appl. No.: 14/286,613

(22) Filed: May 23, 2014

(65) Prior Publication Data

US 2015/0312160 A1    Oct. 29, 2015

Related U.S. Application Data

(60) Provisional application No. 61/984,500, filed on Apr. 25, 2014.

(51) Int. Cl.
*H04L 12/24* (2006.01)
*H04L 12/931* (2013.01)

(52) U.S. Cl.
CPC .................................. *H04L 49/351* (2013.01)

(58) Field of Classification Search
None
See application file for complete search history.

(56) References Cited

U.S. PATENT DOCUMENTS

| 2003/0177346 | A1* | 9/2003 | Drogichen | G06F 1/24 713/100 |
| 2005/0105554 | A1* | 5/2005 | Kagan | H04Q 3/0066 370/468 |
| 2007/0280277 | A1* | 12/2007 | Lund | H04L 49/205 370/412 |
| 2008/0080548 | A1* | 4/2008 | Mullendore | H04L 49/103 370/442 |

(Continued)

*Primary Examiner* — Gregory Sefcheck
*Assistant Examiner* — Jenkey Van
(74) *Attorney, Agent, or Firm* — Oblon, McClelland, Maier & Neustadt, L.L.P.

(57) ABSTRACT

A network switch including a set of communication ports is provided. The communication ports may have an allocated prebuffer to store data during packet switching operations. The network switch may further include a calendar associated with the set of communication ports that provides bandwidth configuration for the set of communication ports. The network switch may further include a secondary calendar that may be dynamically setup. The secondary calendar may provide an alternative bandwidth configuration strategy for the set of communication ports. The switch includes circuitry that may increase the prebuffer size and upon the successful increase of the prebuffer size reconfigure the set of communication ports from the original calendar to the secondary calendar, without a reboot. The circuitry may reset the prebuffer size after reconfiguration is complete and the switch may continue operation according to the reconfigured settings.

18 Claims, 4 Drawing Sheets

(56) References Cited

U.S. PATENT DOCUMENTS

2008/0298383 A1* 12/2008 Wang ............... H04L 12/66
370/439
2011/0255425 A1* 10/2011 Pikkarainen .......... H04W 48/08
370/252

* cited by examiner

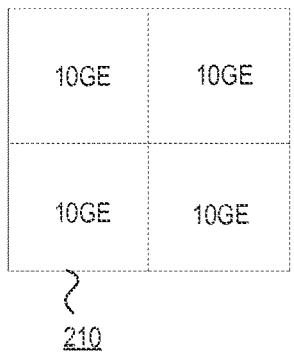
Fig. 2A
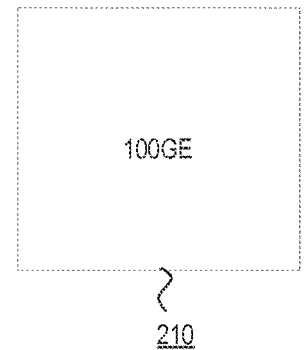
Fig. 2B
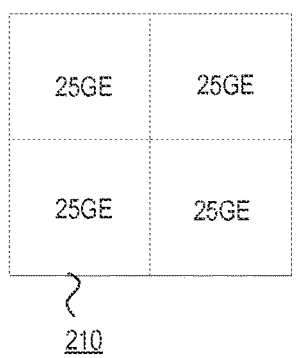
Fig. 2C
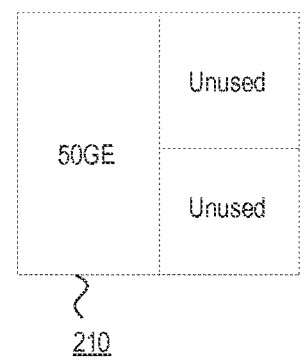
Fig. 2D
Figure 2

SYSTEM FOR FLEXIBLE DYNAMIC REASSIGNMENT OF THROUGHPUT

PRIORITY CLAIM

This application claims priority to provisional application Ser. No. 61/984,500 filed Apr. 25, 2014, which is entirely incorporated by reference.

TECHNICAL FIELD

This disclosure relates to network communication devices, particularly to flexible dynamic reconfiguration of network communication devices, such as a network switch.

BACKGROUND

High speed data networks form part of the backbone of what has become indispensable worldwide data connectivity. Within the data networks, network devices such as switching devices direct data packets from source ports to destination ports, helping to eventually guide the data packets from a source to a destination. Improvements in packet handling, including improvements in path resolution, will further enhance performance of data networks.

BRIEF DESCRIPTION OF THE DRAWINGS

FIGS. 2A, 2B, 2C, and 2D show example configurations of one or more serdes in the device.

DETAILED DESCRIPTION

Communication of data over a network, such as a local area network (LAN), or a wide area network (WAN), may involve a communication device transmitting and/or receiving data, such as communication packets. While the source and destination devices may be responsible for transmission and receipt of data respectively, the network may involve one or more communication devices responsible for relaying the data from the source to the destination device, for example, routers, switches, hubs among several others. The techniques described throughout this disclosure may be applicable to any of the communication devices involved in communication of data over a network, however for purpose of explanation of the technical features, a network switch is used as an example communication device.

A network switch is a network communication device that is used to connect devices together on a computer network by performing a form of packet switching. The further description provides innovative technical features that enable a switch to dynamically reassign throughput to different communication ports in the switch, without rebooting the switch. This may allow the switch to have a flexible modular chassis design, which may be advantageous for data center applications such as in a Top of the Rack (TOR) design switch. The switch may provide additional advantages such as all serializer/deserializers in the switch being reconfigurable even if the number of logical ports in the switch is less than the number of serializers/deserializers. Thus, any of the serializers/deserializers may run at highest port speed without reboot. Further yet, the flexibility imparted avoids designation of particular serializers/deserializers as being reconfigurable, at boot time and allows a user of the switch to defer which serializers/deserializers to reconfigure during run time. Other advantages of the technical features described will become obvious to a person skilled in the art based on the provided description.

Figure 1:
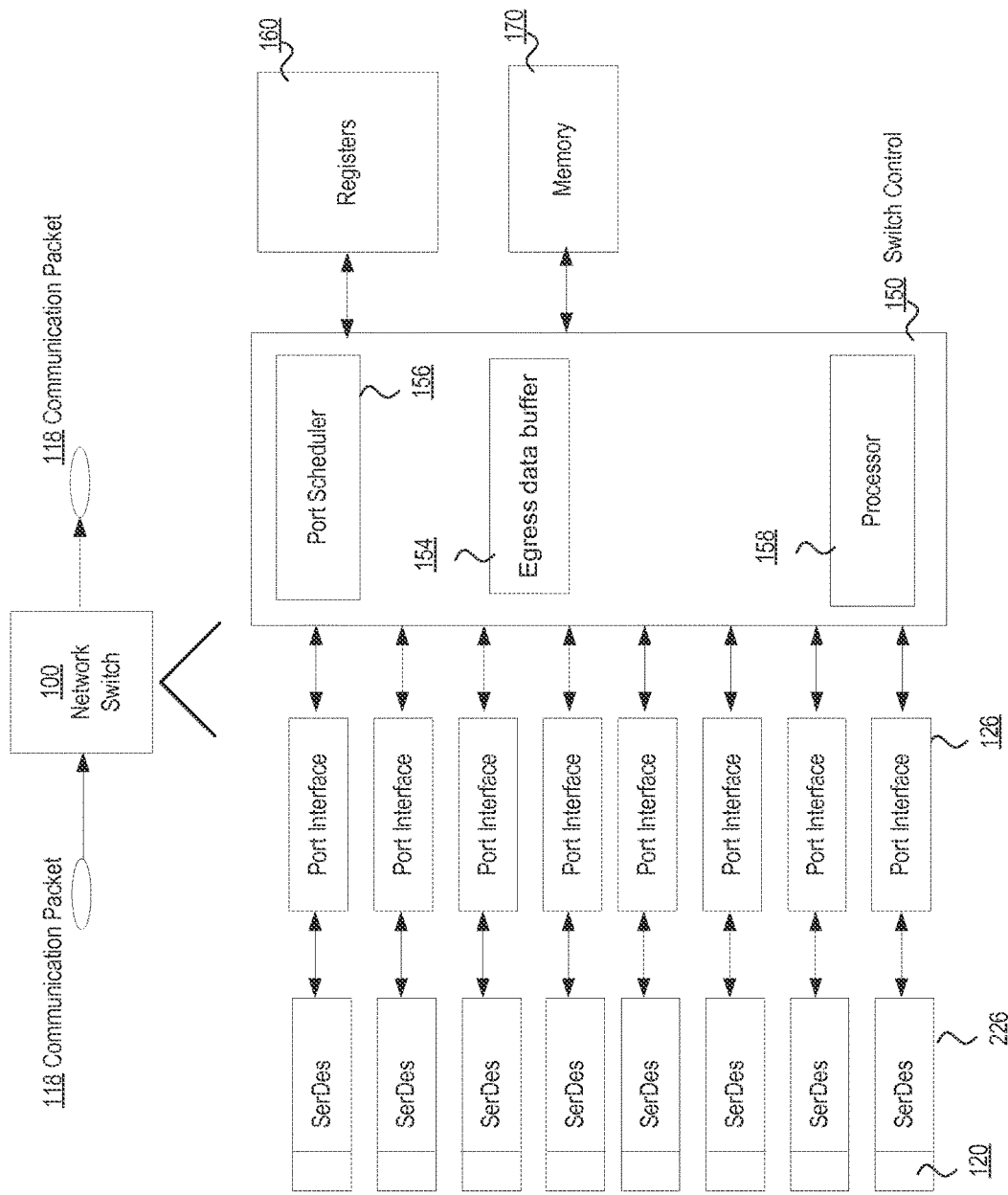
FIG. 1 shows an example of a network communication device.

FIG. 1 shows an example network communication device, such as a switch 100 that switches packets from input ports to output ports. Input ports may also be referred to as ingress ports and output ports may be referred to as egress ports. In the example 100, the switch 100 includes circuitry that provides connections between the ingress ports and the egress ports. View of example components of the circuitry is provided and discussed further. As shown in FIG. 1, a packet 118 may arrive at an input port of the switch 100. Under control of the switch 100, the packet 118 flows through the switching fabric and into a corresponding egress port of the switch 100. The switch may send the packet to a further destination through the egress port. Thus, the ingress, or input ports may receive the packet 118. The packet 118 may be transmitted, within the switch 100, to a corresponding egress, or output port, which forwards the packet 118 towards a further destination.

Each port may provide a physical interface to other networks or devices, such as through a physical network cable (e.g., an Ethernet cable). The ingress and egress ports, independently receive and transmit communication packets over the respective physical network cables.

FIG. 1 further illustrates exemplary details of the circuitry within the switch 100. The circuitry may include components such as Serializer/Deserializer (serdes) cores 226, switch control 150, registers 160, and memory 170. Each port of the switch may have a corresponding serdes core 226. The serdes cores 226 may enable direct connections across backplanes. The serdes cores 226 convert incoming and outgoing data between serial data and parallel interfaces in each direction. The serdes cores 226 corresponding to a collection of ports may be referred to as a serdes macro. In other words, a serdes macro may be a set of serdes cores, each one of the serdes cores 226 corresponding to a respective one of the ports. A serdes macro may be associated with a processing pipeline within the Switch control 150. Further, the serdes macro may be configured by the switch control 150 to operate as a single logical port. The switch control 150 may determine which serdes core, or serdes lane implements a particular port. For example, a configurable mapping between a port number and the one or more serdes used to implement that port number may be provided. Such mapping may be stored in the memory 170 and may be reconfigurable. Further yet, the single logical port, corresponding to one or more serdes in the device, such as a serdes macro, may be configured to operate at an allocated throughput, or line-rate. The serdes cores may include buffer 120 that may be used to buffer the packets being transferred. In addition, the buffer 120 may be used for prebuffering parts of the packets to avoid port underruns. In an example switch, the ingress ports may have respective ingress buffers and the egress ports may have corresponding egress buffers. Alternatively, or in addition, the buffers may be part of the memory 170 or the registers 160 and accessed by the serdes cores during the packet transfers.

The switch control 150 is hardware and includes circuitry such as an egress data buffer 154, a port scheduler 156, and one or more processors 158. The switch control 150 may be responsible for controlling and operating the switch. The switch control 150 may control the switch based on instructions stored on the memory 170. The switch control 150 may be able to configure the various components of the switch, such as the serdes cores, ports and others. For example, the switch control 150 may configure the line rate or bandwidth allocated to the serdes cores.

The switch control 150 may include a port scheduler 156 that may allocate bandwidth to the ports by configuring the serdes accordingly. In an example switch, ingress ports may have a corresponding ingress port scheduler and egress ports may have a corresponding egress port scheduler. The switch control 150 may use data stored on the memory 170 to configure the components of the switch. Alternatively, or in addition, the switch control 150 may receive instructions from a user to reconfigure the components. The switch may be reconfigured dynamically, based on new configuration information. That is the switch may be reconfigured while the switch continues to be in operation. Dynamic reconfiguration may also refer to, for example, assigning, at run-time an allocated or reserved portion of bandwidth to any of the one or more serdes in the switch, instead of to a particular serdes at boot-time. The configuration information may contain or indicate bandwidth allocation strategy such as the bandwidth to be allocated to the serdes in the device. A dynamic reconfiguration may involve changing settings of the serdes, port scheduler, prebuffer, egress data buffer, and/or ports without rebooting the switch. In other words, the switch may continue to receive packets, and maintain communication throughput via the other ports during and after reconfiguration of the ports. The reconfiguration may involve reconfiguring one or more serdes in the device. Further, the reconfiguration may involve reconfiguring a serdes macro. For example, an entire serdes macro may be reconfigured. Alternatively, the reconfiguration may involve some of the ports associated with the serdes macro. Further, multiple serdes macros may be reconfigured using the described techniques. Thus, one or more serdes in the device may be reconfigured.

Alternatively, or in addition, only some of the ports in the switch may be dynamically reconfigured. For example, one or more serdes may be dynamically reconfigured to operate as a logical port at a specified line-rate. The serdes to be reconfigured may be specified by the user dynamically, that is while the switch is in operation. In a case where logical ports are configured, the number of ports of the switch may be lesser than the number of serdes, since a group of serdes may be allocated to operate as a single logical port.

The memory 170 may be one or more memory devices such as optical memory, magnetic memory or any other memory device. The memory devices constituting the memory 170 may be volatile memory and/or non-volatile memory. The memory 170 may store data to be used during startup of the switch, during operation of the switch, as well as during shutdown. The memory 170 may include instructions that may be used by the switch control 150 during operation of the switch. The memory 170 may further store configuration parameters for the several components of the switch. Further yet, the data in the memory 170 may be changed dynamically, such as based on data from buffers, registers, user instructions, or a combination thereof.

The registers 160 may store data used during the operation of the switch. For example, the registers may contain instructions that are being processed by the switch as part of a switch pipeline. Typically, such a pipeline may determine how and when buffers and switch ports are allocated and released so as to time the packet forwarding. The switch pipeline may advantageously overlap some operations so as to hide latency. For example, the switch pipeline may forward a current packet from a first ingress buffer to a corresponding first egress buffer while substantially simultaneously analyzing header information of a subsequent packet buffered in a second ingress port. The operations in the pipeline are thus, organized, or sequenced, in order to optimize efficiency. The sequence of the operations may be predetermined, or may be determined by the switch control 150 based on empirical data. In addition, or alternatively, an example switch may implement further optimizations to the switch pipeline, such as a cut-through mode. In cut-through mode switching, the switch may start forwarding a packet (also called a frame) before the whole packet has been received, typically as soon as a destination address for the packet is identified. Alternatively, a store and forward technique may be implemented in which the entire packet is received before the switch begins to forward the packet to the identified destination. Alternatively, or in addition, a hybrid approach may be used, in which, the switch may operate in the cut-through mode and may be automatically reconfigured to use the store and forward mode in a case where a port error rate rises beyond a threshold value, for example. While examples of some functionality of a switch pipeline are discussed, the structure and/or functionality of the pipeline is not a limiting factor for the dynamic reconfiguration techniques described.

Each port of the switch may have its own line rate (i.e., the rate at which packets are received and sent on the physical interface) based on configuration of the corresponding serdes. For example, the serdes 226, and port 126, may be configured such that the line rates at port 126 may be 10 Mbps, 1 Gbps, 10 Gbps, 100 Gbps, or any other line rate lower or higher than those mentioned. A digital switch will typically have physical ports that are configured to communicate using different protocols at different data rates. For example, a blade within a switch may have certain ports that are 10 Mbps, or 100 Mbps ports and may have other ports and are capable of such data rates as 10 Gbps. The techniques described in this disclosure, however, are not limited to any particular configuration of line rate, number of ports, arrangement of ports, protocols being used.

In an embodiment, one or more serdes may be allocated a portion of the bandwidth supported by the switch. The bandwidth allocation may be done at, or during boot time of the switch and may be allocated to a particular set of serdes. The ports associated with the particular set of serdes may not use the entire allocated bandwidth. However, the particular set of serdes may be reconfigurable so that, at a later time, the ports associated with the particular set of serdes may use the allocated bandwidth. For example, FIG. 2A illustrates an example set of serdes lanes 210 including a set of four serdes lanes, configured to operate as four ports. The serdes lanes 210 may be allocated a 100 G throughput at boot time. Here the unit 100'G' refers to number of Gigabits in the allocated bandwidth and may indicate that a logical port corresponding to the serdes lanes 210 may operate at 100 GE. Here, 100 'GE' refers to Gigabit Ethernet for transmitting Ethernet frames at rates of 100 gigabits per second (100 Gbit/s), as defined by the IEEE 802.3ba-2010 standard. However, each of the four ports associated with the serdes lanes 210 may be operating at 10 GE, at this time, as shown. Thus, the serdes lanes 210, at this time, is utilizing only 40 G of the allocated 100 G throughput. The 60 G throughput that is not being used can be reserved for the serdes lanes 210, so that the serdes lanes 210 may be configured to use the 100 G throughput, at a later time. For example, as shown in FIG. 2B, the serdes lanes 210 may be reconfigured as a single 100 GE logical port. Alternatively, as shown in FIG. 2C the serdes lanes 210 may be configured to operate as four 25 GE ports. In yet another example, as shown in FIG. 2D, the serdes lanes may be configured to operate two serdes lanes as one 50 GE port (with two unused serdes lanes). Although a set four serdes lanes is illustrated, the techniques described in this document are applicable to more than or less than four serdes lanes, such as for example ten lanes, twenty lanes, or two lanes. It will be understood that a 100 G throughput and various port configurations used here, are just a few examples, and as such the techniques described, to allocate a set range of bandwidth, and then adjust the amount of the set range of bandwidth presently being used by a network switch, by this disclosure are not limited to any particular configuration of throughput, line rate, number of ports, and arrangement of ports. A limitation of this approach is that a set range of bandwidth is allocated to a particular set of serdes at boot time and in a case where the particular set of serdes does not use the entire allocated set range of bandwidth, the remainder goes unused and stays reserved for that particular set of serdes. Accordingly, other serdes in the network switch are not able to take advantage of the reserved bandwidth.

Figure 3:
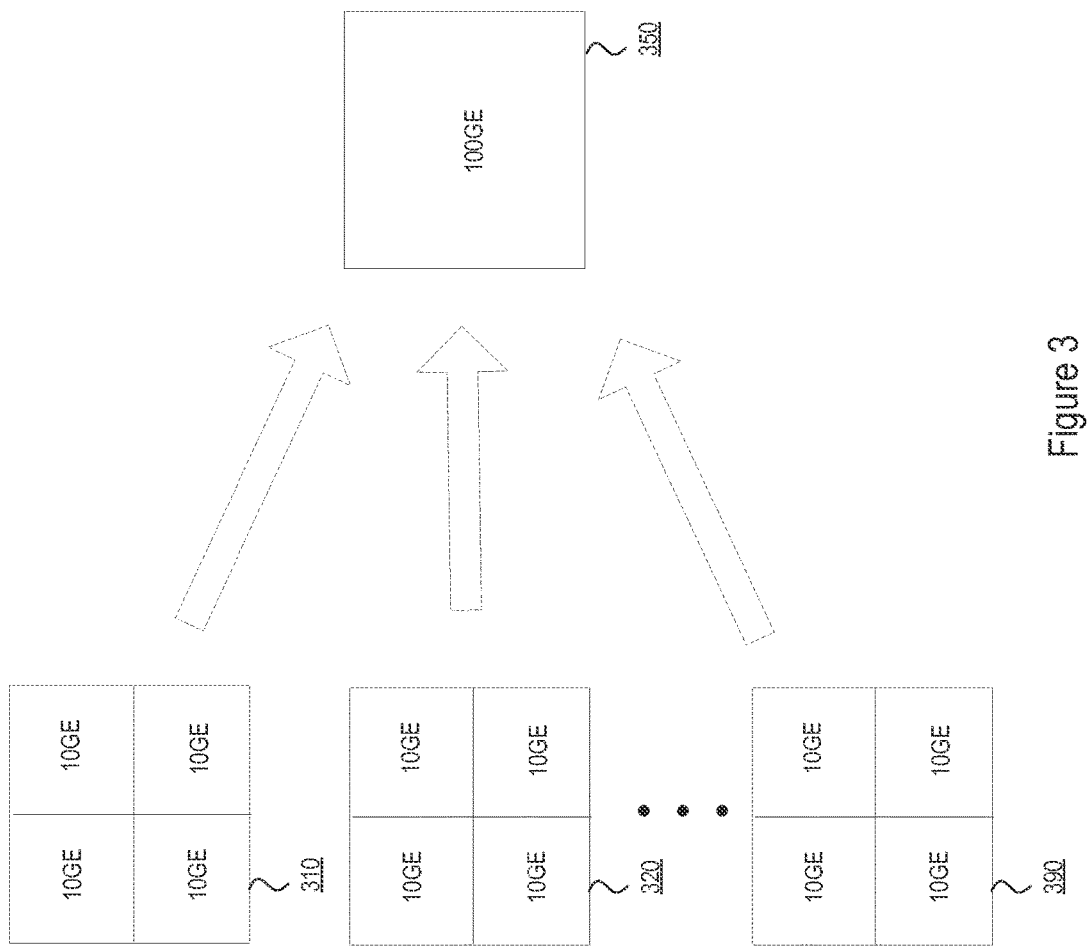
FIG. 3 shows example choices to configure a logical port.

In another embodiment, an example switch can be adapted to dynamically change a set range of bandwidth allocated at or during boot time of the switch so that unused bandwidth remains available for use during operation of the switch. FIG. 3 illustrates a possible configuration of the ports of such an example switch. FIG. 3 shows multiple port-groups associated with serdes lanes such as 310, 320, and 390. For sake of explanation, and as an example, let us assume that, at a later time, a logical port 350 with 100 G throughput is desirable. Other port configurations and throughput rates may be desirable in different examples. However, in this example, a predetermined particular set of serdes lanes is not allocated a 100 G bandwidth at boot time. Instead, a user may defer deciding which serdes lanes will be associated with the logical port 350 of 100 G throughput.

The decision regarding configuring the logical port 350 may be deferred until the network in which the switch is operating is reconfigured. For example, a line-card in a modular chassis of a switch may be unplugged and replaced with a different card operating the switch fabric, or backplane at a different port speed. In another example, a front-panel connector may be unplugged and replaced with breakout cable or vice versa. In case of such arbitrary changes, and/or in case of routine changes to the network, the techniques described in this disclosure may allow the user to dynamically reassign throughput to any serdes lanes in the switch, as may be desired. The dynamic reassignment or reconfiguration, of the serdes may be to create a logical port or in another example to separate a logical port into the constituent serdes to operate independently. The techniques may enable a flexible modular chassis design and a flexible top-of-rack switch design. Further, the techniques may allow the user the flexibility of not specifying at boot time which serdes (or group of ports) are/are not reconfigurable. In effect, all serdes in the switch may be dynamically reconfigurable during operation of the switch, even if the number of logical ports is less than the number of serdes. In addition, or alternatively, any serdes may be capable and configurable of running at a different port speed without rebooting the switch. For example, referring to FIG. 3, FIG. 3A illustrates four serdes lane operating as four 10 GE ports, which may be reconfigured to operate as a single logical port at a highest port speed of 100 GE as shown in FIG. 3B. Alternatively, the serdes may be reconfigured to four ports of 25 GE each or one port of 50 GE using two serdes lanes and two unused lanes as in FIG. 2D, or other possibilities.

The switch may allocate throughput to allow the serdes set 320 to be configured to a desirable line rate, such as in the above example to 100 GE. The user may, at a later time, while the switch is in operation, choose to reconfigure the switch and assign the serdes set 310 to operate as the logical port 350. In this case, the 100 G throughput may be assigned to be used by the logical port 350, and thus the serdes set 310, without rebooting the switch. Alternatively, or in addition, the serdes set 390 may be chosen to operate as the logical port 350. In this case, the serdes set 390 may be allocated the desired throughput, in this case 100 G. The switch may continue to operate with the new logical port 350, without a reboot, and without affecting the operation of the other ports of the switch. In another example, after the serdes set 310 was configured to operate as the logical port 350, it may be discontinued so that the serdes set 310 may operate as before, such as independent ports corresponding to each of the constituent serdes cores. Alternatively, or in addition, the serdes set 310 may be replaced by serdes set 320 as the logical port 350. In this case, the desired throughput would be reallocated from the serdes set 310 to the serdes set 320 so that the logical port 350 operates at the desired line rate. The above described reconfigurations may be performed by the switch without a reboot of the switch and without affecting operation of the other ports of the switch, which continue to pass traffic. Reconfigurations of the serdes, other than the examples described above are possible and the above examples are not to be considered as limiting.

The switch may enable dynamic reconfiguration of the serdes, and/or serdes macros using a set of calendars. While the present disclosure does not limit the number of calendars in a switch, for purpose of further description, a switch with a pair of calendars is used as an example. In other examples, there may be more calendars. A calendar may be a set of registers, such as a collection of registers 160. The port scheduler 156 may operate parts of the switch pipeline according to the contents of a calendar. The calendar indicates how the throughput of the switch is divided among the ports and/or the serdes of the switch. At a given time, any one calendar may be a 'primary' calendar. The other calendar may be referred to as a 'secondary' or 'backup' calendar. The port scheduler 156 may operate the switch pipeline according to contents of the primary calendar. The secondary calendar may contain configuration information that may be used to reconfigure the ports implemented by one or more serdes. Alternatively, or in addition, the reconfiguration information may be obtained from the memory 170 or via user instruction. The secondary calendar may be updated according to the reconfiguration information that may be obtained from other sources. In yet another example, a user may modify the contents of the secondary calendar providing the reconfiguration information. In example switches, such as those operating in cut-through mode, the ingress ports and egress ports may each have a corresponding pair of primary and secondary calendars. In such cases, the ingress port scheduler may use the primary ingress calendar to schedule operations of the ingress ports, while the egress port scheduler may use the primary egress calendar to schedule operations of the egress ports.

The primary calendar and the secondary calendar may be setup dynamically. For example, the secondary calendar may be setup for a new configuration while the primary calendar is being used by the port schedulers during operation of the switch. During dynamic reconfiguration, the secondary calendar may be designated as the primary calendar and vice versa and the switch continues to operate receiving and transmitting data, without a reboot, using the configuration information according to the secondary calendar. That is the port schedulers may subsequently operate the switch pipeline according to the newly designated primary calendar. The earlier primary calendar may be available for setup as the secondary calendar. The changeover between the primary and secondary calendars may be performed dynamically, or "on the fly", in response to a trigger, such as a user instruction, scheduled event, or detection of a predetermined condition during operation of the switch, among others.

The dynamic reconfiguration of the switch may enable the secondary calendar contents to be arbitrarily different than the primary calendar contents. Typically, since the switch pipeline may operate according to the calendar, making arbitrary changes to the calendar may cause erroneous behavior of the pipeline. Arbitrary changes to the configuration information may adversely affect a processing pipeline that the switch control 150 may be operating upon. For example, two picks, or two operations of the same port without a predetermined spacing between the two operations may cause an error in the switch pipeline, or may cause the pipeline to stall. A predetermined, minimum spacing between two picks of the same port may enable the pipeline to accommodate pipeline hazards so as to process the operations of switch in an efficient manner. Therefore, in case a secondary calendar containing an alternative or a secondary configuration information is used, the predetermined minimum spacing may be violated. This may cause the pipeline efficiencies to be lost and moreover an error in the pipeline. Thus, the secondary calendar may be limited to contain configuration information so as to avoid not having the minimum spacing. Therefore, generally, very few changes between a primary and secondary calendar are permitted limiting flexibility of the reconfiguration of the switch. For example, in a typical switch, the secondary calendar may not be able to assign the throughput differently from one set of serdes to another, while the device is up. Thus, in general, a reboot may be necessitated to transition the port configuration from configuration information from one calendar (such as the primary calendar) to configuration information in another calendar (such as the secondary calendar).

However, the techniques described in the present disclosure overcome such limitations, allowing complete flexibility when reconfiguring the switch, such as to reallocate bandwidth from one serdes to another, or from one serdes macro to another, without a reboot or restart of the switch. Further, the techniques described allow arbitrary edits to the secondary configuration. That is, new calendar and old calendar contents may be unrelated. Thus, bandwidth allocation to ports in new calendar may be completely unrelated to the bandwidth allocation in the old calendar. The port scheduler(s) may handle such arbitrary changes by protecting against the minimum spacing violations during switchover from the old calendar to the new calendar. For example, when a minimum spacing per port violation is detected during a calendar switchover, the schedule may invalidate the pick. A 'pick' is a decision by the Port Scheduler to use a particular clock cycle within the switch device to transmit data for a particular port number. Thus, the port scheduler may 'pick' (or select) a port, or alternately that it has given a port a slot in the pipeline to transmit data. However, by 'invalidating' a pick (or a slot) the port prohibited from, or is not allowed to use the pick/slot to transmit data, even though it was selected. Thus, during the calendar switchover, a check or validation may occur, after the port scheduler makes a decision, so as to ensure that the switchover from primary to secondary calendar does not create an illegal event in the processing pipeline. A violation and corresponding protection may occur in the middle of a packet switching operation, even if the packet is being switched using the cut-through mode. Thus, in effect, the switch may allow any one serdes to be reconfigured to an allocated throughput, and further to defer the decision of which serdes will use the allocated throughput.

Figure 4:
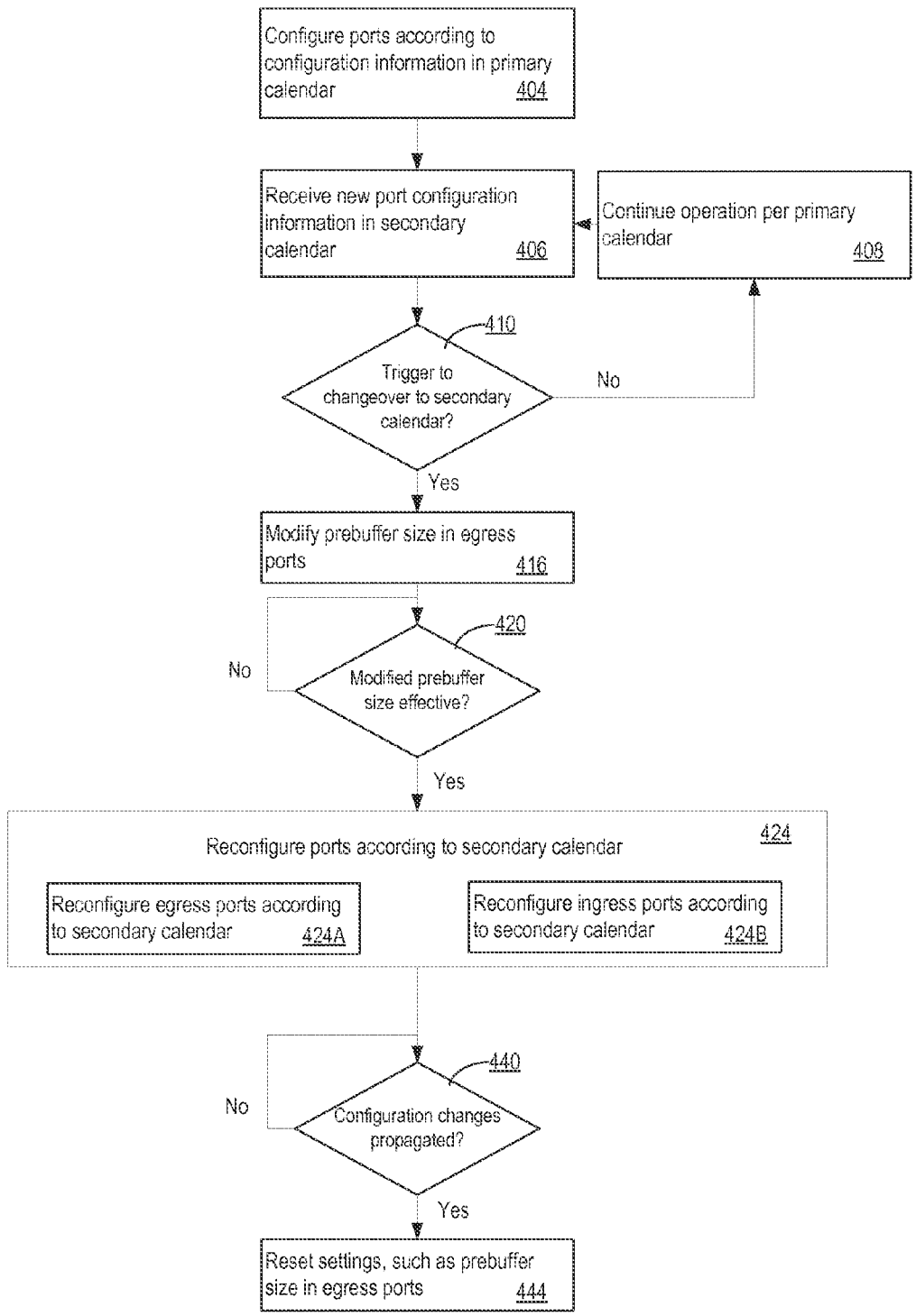
FIG. 4 shows a flowchart of example steps that may be performed by a network communication device.

The switch may take at least the steps illustrated by the flowchart in FIG. 4 to enable dynamic reconfiguration of the ports based on configuration information in the secondary calendar. As illustrated, the switch may be operating according to the configuration information in the primary calendar, 404. Secondary configuration information may be obtained in the secondary calendar, 406. The secondary configuration information may be entered by the user, via a user interface. For example, the user may provide a new calendar for new port configuration that may be written into the secondary calendar. In another example, the user may be able to indicate desired outcome, such as the serdes to be reconfigured, and a new calendar with new port configuration may be generated and subsequently written into the secondary calendar. Alternatively, or in addition, the secondary configuration information may be obtained from the memory 170. The secondary calendar may be setup while the switch continues to operate using the primary calendar, 408. Further, the secondary configuration information received may have no relationship to the primary configuration information in the primary calendar. That is, changeover to the secondary calendar may change the operation of the switch arbitrarily compared to the primary calendar.

A trigger event may be detected that may initiate a changeover from the primary calendar to the secondary calendar, 410. The trigger event may be receipt of an instruction, or a predetermined event such as an error, or a predetermined threshold being crossed. In response to such a trigger event, the switch may temporarily modify a prebuffer size associated with the egress ports, 416. The prebuffer size may represent an amount of data from a communication packet that may be stored in the corresponding port buffer prior to the port transmitting a start of packet indication to a destination of the communication packet. The prebuffer size may be determined so as to avoid port underruns. The prebuffer size may be a predetermined size or may be set by the switch control 150.

For example, in case of a buffer underrun, after commencing onward transmission of a data packet via a port, the buffer associated with the port may become empty until the packet onward transmission has ended. This may cause corruption of the data packet being transmitted. Therefore, a packet, or parts of a packet may be prebuffered before an onward transmission of the packet is commenced. The prebuffer size may represent the amount of a packet that may be prebuffered before such commencement of onward transmission. A counter-consideration so as to minimize latency is to avoid the packet spending more time in the port buffer. To achieve these opposing aims, an optimal onward transmission start point may be determined. The onward transmission start point, and thus the prebuffer size describes the amount of the packet which is already stored in the port buffer, or prebuffer, prior to commencing onward transmission of the packet. Thus, the prebuffer is the amount of data that may used for a particular packet in order to begin transmitting a 'start of packet' data to the port. This mechanism may be, for example, a type of jitter buffer that is designed to avoid port underrun. The prebuffer may be allocated within the egress data buffer 154 or as a separate buffer by itself. For example, the prebuffer may be in addition to other buffers that a port may use.

In an example, the egress port scheduler may be responsible for setting and modifying prebuffer size. Thus, temporarily increasing prebuffer may be part of a sequence to flexibly reconfigure throughput of the ports. For example, the size of the prebuffer corresponding to the serdes associated with the egress ports to be reconfigured may be increased. With reference to FIG. 3, if the serdes 320 are being assigned the allocated bandwidth, the prebuffer associated with the serdes 320 may be increased. Alternatively, prebuffer size of all ports within the device may be affected. For example, the prebuffer size of all ports may be updated when the device is operating in cut-through mode. In another example, the cut-through mode may result in updating prebuffer size of only those serdes that are being reconfigured and the other serdes may not be affected. The prebuffer associated with the serdes 320 may be part of the buffers associated with the serdes 320.

For example, in case the calendar changeover is performed in the middle of a packet switching operation, the resulting slot invalidation may cause spacing between the port operations to exceed a predetermined maximum spacing between operations of a port in the switch pipeline. The slot invalidation may increase jitter as the packet leaves the switch via the egress ports. The switch control 150 may temporarily increase latency for all ports to compensate for the potential increase in packet delay through egress scheduler. In case the switch is not operating in cut-through mode, or the cut-through mode is disabled for some reason, the delay may be temporarily increased for only those ports that use the same egress scheduler (or same egress pipe) as the serdes being reconfigured, and not all ports in the device. Further, if a cut-through mode of the switch is enabled, the switch control may additionally compensate for delay through ingress scheduler. The increase in prebuffer size may accommodate larger 'maximum delays' that may be caused by the increased latencies. Thus, prebuffer size may be increased by an amount corresponding to a predetermined delay due to the increased latencies.

The switch may confirm that the modified prebuffer size did take effect, 420. Alternatively, or in addition, the switch may wait for a predetermined time to ensure that the modification to the prebuffer size takes effect. The predetermined time to wait may be a preset value or a value empirically determined by the switch. The switch may wait until the prebuffer size is modified to the requested modified prebuffer size and before reconfiguring the ports according to the secondary calendar, 424. The ingress and egress schedulers may be changed to use the secondary calendar as part of the reconfiguration, 424A.

The switch may then wait for enough time to ensure calendar changes have propagated to switch output, 440. The switch may determine that the changes have been propagated, and thus the reconfiguration completed, by determining current status of the components of the switch. Alternatively, or in addition, the switch may delay further processing by the serdes for a predetermined amount of time. The predetermined amount of time to delay processing may be a preset value or determined by the switch empirically. The amount of time the switch may wait to ensure successful propagation of calendar changes may or may not be different than the amount of time the switch may wait to ensure increase in prebuffer size. In response to confirmation that the switch is operating according to the secondary calendar, the changes made to accommodate the changeover of the calendar may be reset, 444. For example, the prebuffer size changes may be reset to the original values. Further, the increased latencies may be reset to the original values. In effect, prebuffer settings may be reset to exclude the larger delay that may occur during switchover, and the switch thus prepares for resumption of operation prior to the change in prebuffer size.

Thus, a switch, such as a data center switch, adopting the technical features described in this disclosure allows a user to dynamically reassign throughput to different serdes while the switch is up, without rebooting the switch, and without affecting traffic through the other ports of the switch. This may enable the switch to have a flexible modular chassis in which a user may unplug any line-card and replace with a different card operating backplane at a different port speed. The user may further be able to unplug any front-panel connector and replace with breakout cable or vice versa. Further yet, the user does not need to specify at boot time which serdes is reconfigurable (and which is not). All serdes are reconfigurable, even if the number of logical port is less than the number of serdes. Therefore, the provided innovative technical features enable the user to flexibly reconfigure between port configurations using minimum cabling (which may be economical for low bandwidth situations) and port configuration with maximum bandwidth (economical for high bandwidth) without reboot.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms.

Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A method comprising:
configuring, using circuitry, communication ports of a network switch based on configuration information contained in a first set of registers;
dynamically storing, using the circuitry, configuration information in a second set of registers while the communication ports of the network switch are operable with the configuration contained in the first set of registers, wherein the configuration information in the first and second set of registers comprise bandwidth allocation information;
receiving, using the circuitry, an instruction to reconfigure the communication ports according to the configuration information stored in the second set of registers;
determining, using the circuitry, whether transition of the communication ports of the network switch from operation with the configuration information contained in the first set of registers to operation with the configuration information stored in the second set of registers will create communication errors based on minimum distance requirements between transmission slots;
increasing, using circuitry, a prebuffer associated with the communication ports, in response to receipt of said instruction;
reconfiguring, using circuitry, the communication ports based on the configuration information stored in the second set of registers; and
overriding communication by at least one of the communication ports at a particular slot when communication in the particular slot is determined to violate the minimum distance requirements, the communication in the particular slot being based on the configuration information stored in the second set of registers.

2. The method of claim 1, further comprising:
reducing, using circuitry, the increased prebuffer associated with the communication ports.

3. The method of claim 2, wherein the prebuffer is reduced in response to completion of the reconfiguration of the communication ports of the network switch.

4. The method of claim 2, wherein the prebuffer is reduced in response to completion of a predetermined duration of time.

5. The method of claim 1, wherein the prebuffer is associated with egress ports of the communication ports of the switch.

6. The method of claim 5, further comprising:
increasing, using circuitry, a size of another prebuffer associated with ingress ports of the communication ports of the switch, in response to the receipt of the instruction.

7. The method of claim 1, wherein configuring the communication ports of the network switch based on the first set of registers comprises allocating a portion of bandwidth to a first set of communication ports and reconfiguring the communication ports based on the second set of registers comprises allocating said portion of bandwidth to a second set of communication ports.

8. An apparatus, comprising:
a set of communication ports, wherein the set of communication ports is allocated a prebuffer having a prebuffer size equal to a first prebuffer size;
a first calendar associated with the set of communication ports, wherein the first calendar assigns a bandwidth to a first subset of communication ports from the set of communication ports;
circuitry configured to operate the set of communication ports based on the bandwidth assignment according to the first calendar;
a second calendar, wherein the second calendar assigns said bandwidth to a second subset of communication ports from the set of communication ports;
circuitry configured to increase the prebuffer size to a second prebuffer size in response to an instruction to reconfigure the set of communication ports according to the second calendar;
circuitry configured to reconfigure the set of communication ports from the first calendar to the second calendar;
circuitry configured to determine whether reconfiguration of the set of communication ports from the first calendar to the second calendar will cause communication errors based on minimum distance requirements between transmission slots;
circuitry configured to override communication by at least one of the communication ports at a particular slot when communication in the particular slot is determined to violate the minimum distance requirements, the communication in the particular slot being based on the second calendar; and
circuitry configured to reset the prebuffer size.

9. The apparatus of claim 8, wherein the first prebuffer size is increased by an amount corresponding to a predetermined delay.

10. The apparatus of claim 9 wherein the prebuffer size allocated to each communication port of the apparatus is increased by the predetermined amount.

11. The apparatus of claim 8, wherein circuitry is configured to reconfigure the set of communication ports in response to completion of the increase in the prebuffer size.

12. The apparatus of claim 8, wherein the reconfiguration is performed while the apparatus is in operation.

13. A non-transitory computer readable memory comprising instructions that, when executed by one or more processors, cause the one or more processors to perform a method comprising:
allocating bandwidth of a network switch among a plurality of serdes of the network switch according to a bandwidth allocation strategy, wherein a pre-allocated portion of bandwidth is assigned to a first subset of serdes of the plurality of serdes;
receiving an alternative bandwidth allocation strategy after the plurality of serdes are in communication using the allocated bandwidth of the network switch according to the bandwidth allocation strategy, wherein the pre-allocated portion of bandwidth is assigned to a second subset of serdes of the plurality of serdes;
receiving a trigger to reallocate said bandwidth of the network switch based on the alternative bandwidth strategy; and
dynamically reallocating the bandwidth of the network switch, without a communication interruption among the serdes of the network switch, in response to the trigger, wherein the pre-allocated portion of bandwidth is assigned to the second subset of serdes according to the alternative bandwidth allocation strategy, determining whether the alternative bandwidth allocation strategy will cause communication errors based on minimum distance requirements between communication slots; and overriding communication by at least one of the serdes at a particular slot when communication in the particular slot is determined to violate the minimum distance requirements, the communication in the particular slot being based on the alternative bandwidth allocation strategy.

14. The non-transitory computer readable memory of claim 13, wherein the bandwidth reallocation is performed without rebooting the network switch.

15. The non-transitory computer readable memory of claim 13, further comprising:
instructions to modify a first size of a prebuffer allocated for the serdes, wherein the prebuffer is modified to a second size.

16. The non-transitory computer-readable memory of claim 15, wherein the size of the prebuffer is modified in response to the received trigger, and prior to the reallocation of bandwidth.

17. The non-statutory computer readable memory of claim 16, further comprising:
instructions to reset the prebuffer to the first size in response to completion of the reallocation of bandwidth.

18. The non-transitory computer readable memory of claim 15, wherein the size of the prebuffer is modified after a predetermined duration of time.

* * * * *